Patented Dec. 10, 1935

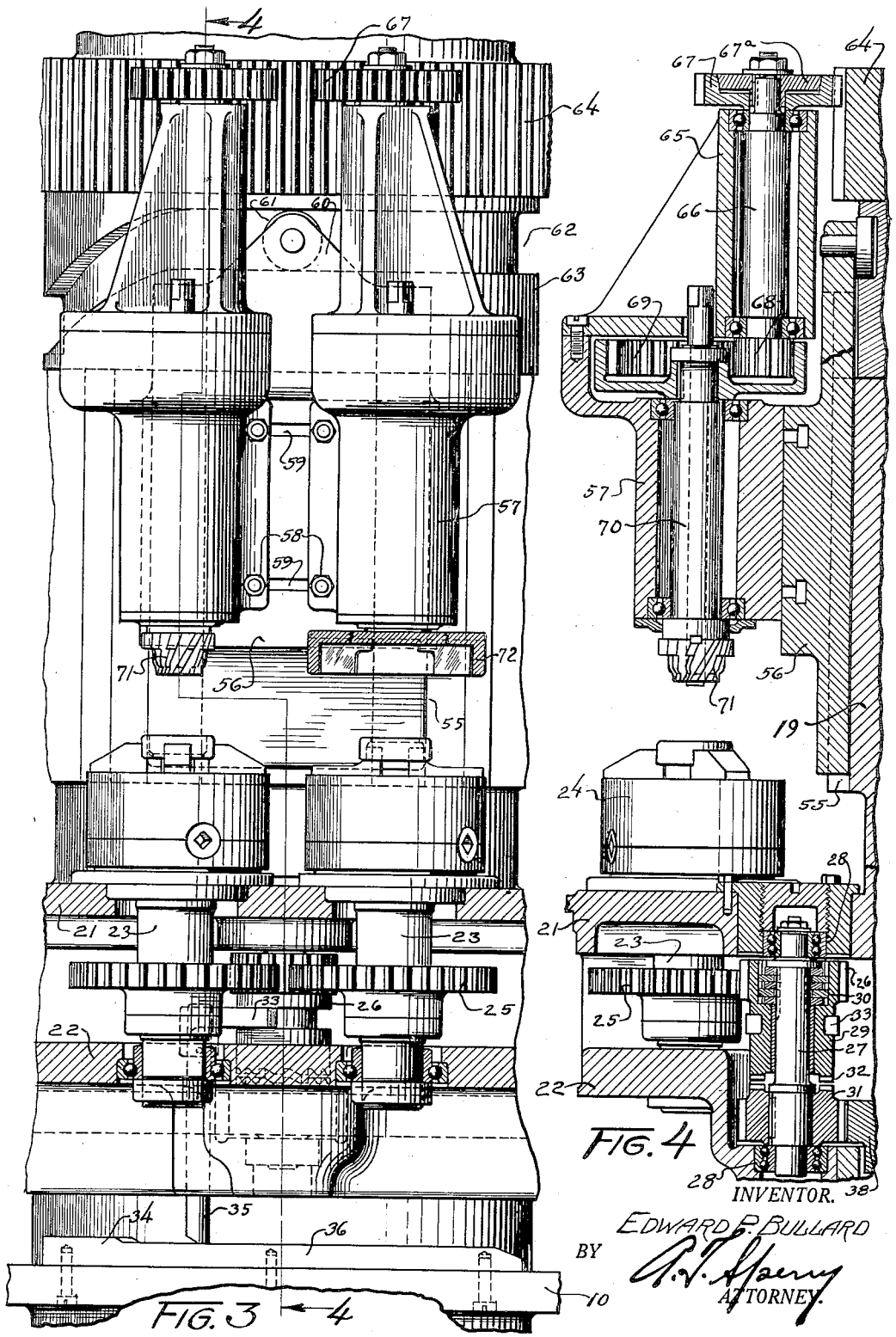

2,023,779

UNITED STATES PATENT OFFICE 2,023,779

MULTIPLE SPINDLE METAL WORKING APPARATUS

Edward P. Bullard, Bridgeport, Conn., assignor to The Bullard Company, a corporation of Connecticut Application March 11, 1933, Serial No. 660,371

25 Claims. (Cl. 29—38)

This invention relates to a multiple spindle metal working apparatus and is a companion case to the co-pending application Ser. No. 660,421 filed on even date herewith.

It is among the more general objects of the invention to provide a multiple spindle apparatus for carrying out the method of metal working set forth in Patent No. 1,899,608, issued February 28, 1933.

A further object is to provide a multiple spindle apparatus, each spindle and tool head of which will partake of the operative function set forth in the co-pending application above enumerated.

A further object is to provide a multiple spindle continuously operating instrumentality, each station of which partakes of the functions of the single station apparatus set forth in the co-pending application, Ser. No. 660,421, dated March 11, 1933 to thus perform the method set forth in my prior patent by which a plurality of pieces of work will be simultaneously operated upon.

A further object is to provide a continuously operated mechanism provided with a plurality of pairs of different working tools so that in the operation of the device, work may be taken from one station after it has been operated upon by the tool thereof and placed in an adjacent station to be operated upon by a dissimilar tool so as to perform two dissimilar operations on the work piece.

Other and more specific objects of the invention will be apparent from a consideration of the drawings and the following specification and include specific structural details and combination and interrelation of parts whereby the whole forms a simple, efficient mass-production machine.

Broadly speaking, the apparatus includes a spindle carrying table adapted to be continuously rotated at uniform speed and which carries for rotation therewith a column upon which are mounted tool slides, one for each pair of spindles, each carrying a pair of tool heads. During the rotation and as a function thereof, the tool heads are moved vertically to place a cutting tool in potential cutting position with respect to the work and thereafter continued rotation will affect a rotation of the tool so as to bring about the method outlined in the prior patent.

Towards the end of the cycle, the tool slide is moved away from the work which is then free to be removed from the apparatus or to be transferred to another spindle which has in registration therewith a tool slide carrying a different type of tool. During the continuous movement of the carrier, it will be understood that the spindles are rotated at cutting speeds except while passing through a predetermined sector at which time they are at rest and at which time the tool slides are away from the work, thereby giving the operator an opportunity to remove or change the position of the work as the table moves past this so-called loading station. With respect to the more general features of this type of machine, reference may be had to my prior Patent No. 1,574,726, which illustrates the continuous moving spindle table but from which the present invention departs with respect to certain important structural and functional features as will be hereinafter pointed out.

In the drawings

Fig. 3 is a fragmentary front elevation showing one pair of spindles and tool heads and Fig. 4 is a vertical section taken on the broken line 4—4 of Fig. 3.

Figure 1:
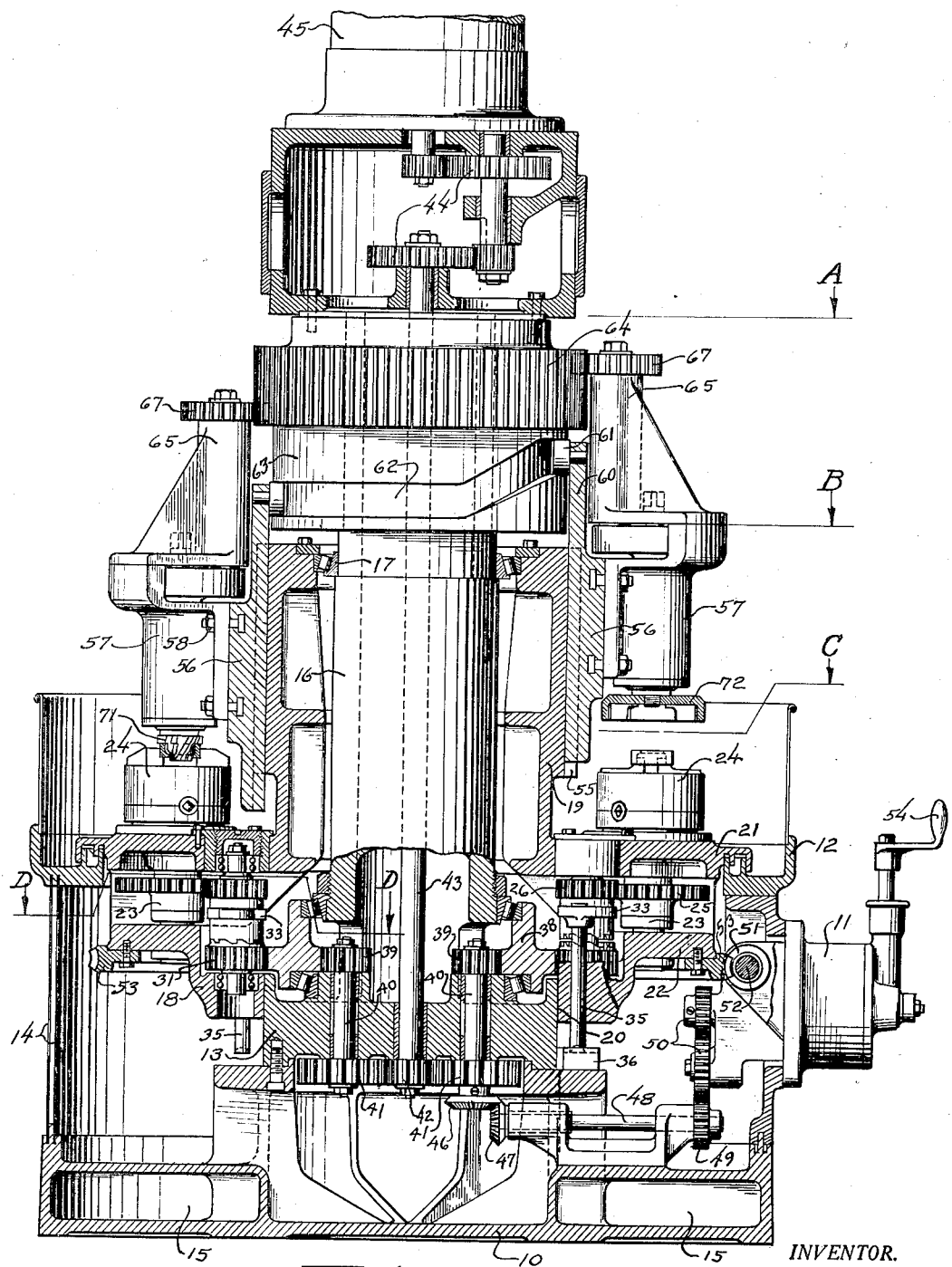
Fig. 1 is a vertical sectional view showing one preferred embodiment of the present invention.
Figure 2:
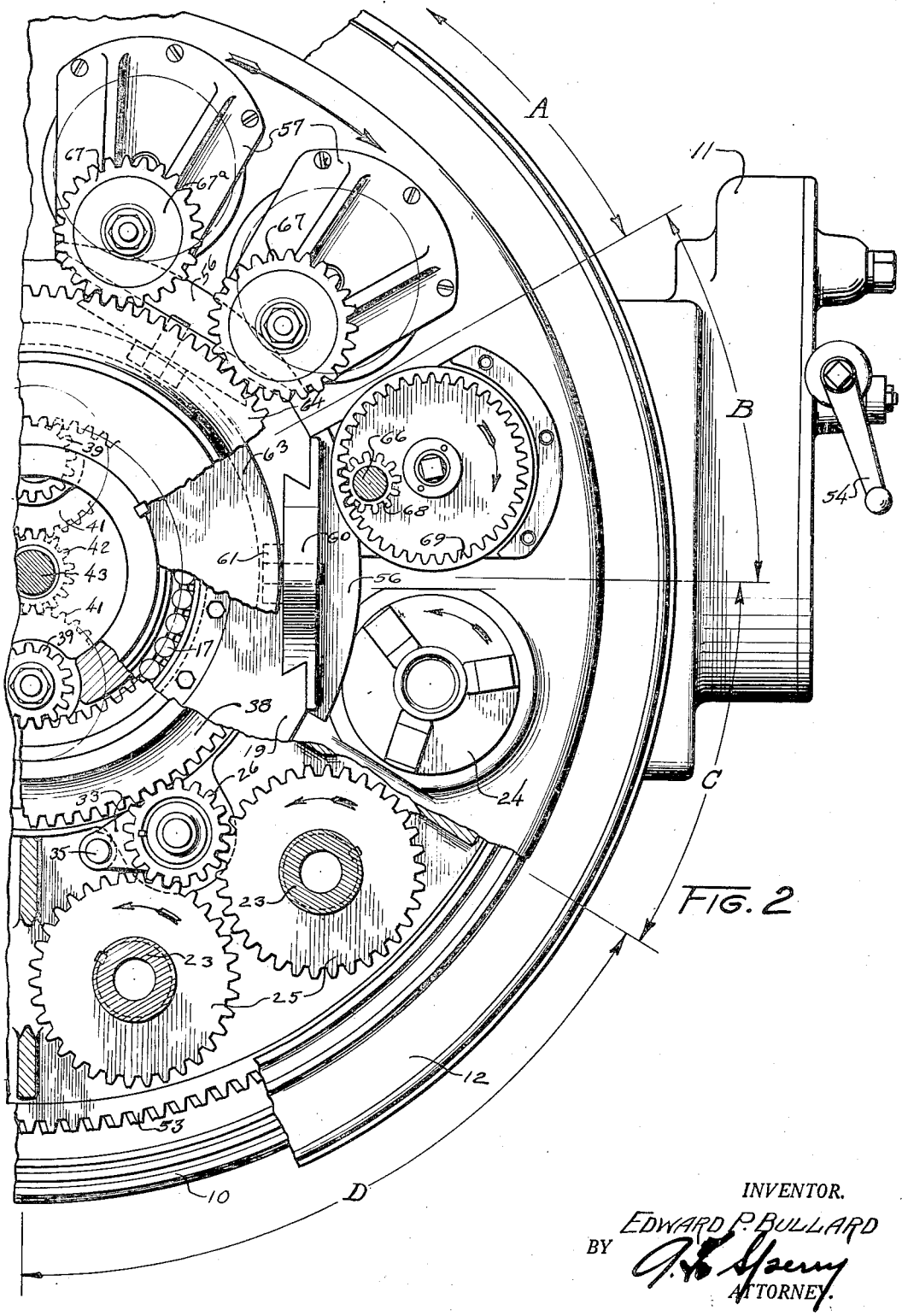
Fig. 2 is a horizontal section showing sectors taken on different planes as indicated by the letters A, B, C and D in Fig. 1.

Referring to the drawings, it will be seen that the particular form of the invention herein shown by way of illustration is designed as a vertical machine, though obviously arranged for horizontal disposition if so desired. The apparatus includes a fixed base 10 upon which is mounted a housing 11 for the table drive gearing and the table clutch. The base includes an annular carrier ring 12 as well as a central stationary bearing block 13. Slidable panels as at 14 may be provided to give access to the mechanism therein and if desired, lubricating oil and cutting compound receptacles 15 may be formed therein. The bearing block 13 which is fixed to the base extends upwardly to form a fixed central column 16 upon which the upper end of the carrier has a bearing as at 17. The carrier includes a lower annular portion 18 which extends upwardly to form a rotating column 19. In that form of the invention illustrated, the carrier is mainly supported through the bearing 17 on the fixed column 16 while being guided by its bearing as at 20 against the outer face of the round block 13. The carrier is formed with a pair of outwardly extending upper and lower flanges 21 and 22 respectively, each of which is apertured to provide for the support therethrough of work spindles 23. Each work spindle carries a chuck or fixture 24 mounted above the flange 21 and with a spindle driving gear 25 intermediate the flanges. The spindles are preferably arranged in pairs, each pair of gears 25 being driven from a toothed spindle drive sleeve 26 which is loosely mounted upon its spindle 27 mounted in bearings 28 of the flanges 21 and 22. (See Fig. 4.) The sleeve 26 is preferably provided with an elongated hub 29 and is hollowed to receive friction clutch discs 30. Mounted on the lower end of the spindle 27 and fixed for rotation therewith is a driving gear 31 having clutch teeth 32 which are engageable by similar clutch teeth on the hub 29 of the sleeve 26. An operating fork 33 is provided for sliding the sleeve 26 vertically, the arrangement being such that when the sleeve is raised it will cause a frictional driving relation between the plates so as to initially start rotation of the sleeve 26 and thus the spindle gears 25 and the spindles. Such upward slide movement may be provided by a cam portion 34 (see Fig. 3) which engages a plunger 35 connected with the fork 33. The remainder of the cam as indicated at 36 is designed to hold the flanges and thus the sleeve 26 in neutral position; that position being indicated in Figs. 3 and 4. Since the gear spindle, the sleeve 26, the fork and the plunger 35 are being continuously rotated with the carrier, it will be seen that as the carrier approaches a predetermined sector, it will strike the front of the cam which will thus move the parts to neutral position. As it moves towards the end of the cam, the plunger will strike the portion 34 thus causing frictional drive of the gear to initial spindle rotation. Further movement of the carrier will move the plunger 35 to the end of the cam where it will drop in full downward position whereby the clutch teeth 32 will be engaged to provide a positive drive from the gear 31 to the spindle. The gears 31 are adapted to be continuously driven from an internally and externally toothed ring gear 38, the outer teeth of which mesh with the gears 31 while the inner teeth mesh with one or more driving gears 39 which are mounted upon driving shafts 40 carried in the block 13, the lower ends of which shafts 40 are provided with gears 41 continuously meshing with a main driving gear 42 carried upon the lower end of a main drive shaft 43 which through gearing 44 is continuously driven by a suitable source of power such as may be mounted in the motor housing 45.

For continuously rotating the carrier, one of the spindles 40 is provided with a bevel pinion 46 cooperating with a similar pinion 47 on a horizontal shaft 48, the opposite end of which is provided with a gear 49 which meshes with one of the pair of gears 50, the latter being mounted on the carrier clutch bracket 11 and being adapted to drive through suitable clutch mechanism, not shown in detail, a worm 51 mounted on a worm shaft 52, the worm being in constant mesh with the peripheral worm gear 53 mounted on the lower flange 22 of the carrier. The clutch is adapted to be manually controlled through the medium of a hand lever 54 mounted on the bracket 11. It will thus be seen that the carrier is adapted to be continuously rotated by and with the drive to the spindle and at a definite speed relation with respect thereto, the speed ratio being variable by suitable mechanisms in the bracket 11.

The upwardly extending column 19 of the carrier is provided with a plurality of slide ways 55, there being one slide way for each pair of spindles. Each way has mounted for vertical movement therein a single tool slide 56 which has a curved outer surface adapted to support a pair of tool heads 57. Each tool head is adjustably supported as by bolts 58 which pass through the tool heads and which have headed ends supported in transverse key slots 59 in the curved surface of the slide thus to provide individual lateral adjustment of each head so that they may be properly registered with the individual spindles thereof and may be adjusted to compensate for wear on the cutter. Each slide is further provided with an extending arm 60 which carries a cam engaging roller 61 which is received within a cam groove 62 of a fixed cam 63 which is supported by and preferably forms a part of the upwardly extending portion of the base and is provided with a wide fixed tool rotating gear 64. Each tool head 57 is provided with an upwardly extending bracket 65 which supports the vertical shaft 66, the upper end of which extends beyond the bracket and carries a gear 67, the teeth of which are in constant mesh with the teeth of the fixed gear 64. Gear 67 is clutched to the shaft 66 by a clutch plate 67a which may be loosened to admit rotation of the shaft with respect to the gear so as to provide for angular adjustment.

As the carrier revolves about the base, the tool slide supported thereon will be rotated about the gear 64 which, through engagement with the gear 67, will rotate the shaft 66 as a result of such rotation of the carrier. It will be noted that the arcuate or curved surface of the slides 56 permit their arcuate adjustment without affecting the relationship of the gears 64 and 67. It will be further noted that the wide surface of the gear 64 will permit vertical movement of the slide without disengaging the gear 67 from the teeth of the gear 64. The same rotary movement of the carrier also causes the cam roller 61 to follow the path of the cam groove 62 thus to provide not only rotary movement of the tool itself, but vertical movement of the tool slide as a consequence of the rotary movement of the carrier with respect to the base.

The lower end of the shaft 66 is provided with a gear 68 (see Fig. 4) which meshes with the internal gear teeth of an annular gear 69 carried by the tool shaft 70 upon the lower end of which is fixed the tool 71 or a companion tool 72. The gear ratios of gears 64 and 67 and of 68 and 69 are preferably such as to provide for only one single revolution of the tool shaft 70 during the complete rotation of the carrier while the spindle driving gearing is such as to provide for many rotations of the spindle for every revolution of the carrier; thus to provide for rotation of the spindle at cutting speeds while providing for only one rotation of the cutter during a complete cycle of operation, the same being arranged for carrying out the method of my prior patent and operating in principle substantially similar to the single spindle mechanism set forth in my copending application.

With the apparatus at rest, it will be noted that the various pairs of heads mounted upon various slides will at any one time be in different positions and in different phases of rotation of the tool; the slide at the operator or loading station being in raised position while the remainder of the slides are in lower position, the cam groove being such as to provide a quick downward movement of the tool as it passes from the loading sector and having a dwell thereon which retains the tools in their downward position until they again approach the loading sector. Thus, as shown in Figs. 3 and 4, the tool slides at the loading sector is preferably adjacent the bracket 11 so as to permit the operator to conveniently raise the clutch handle 54.

In the operation of the device, the spindle rotation is controlled by the initial driving source such as a motor in the housing 45 which may be conveniently controlled electrically from the loading station, such control forming no part of the present invention and not being here illustrated. With the power applied, the shaft 43 is rotated thus driving gears 41 and through them the annular gear 38 of the gears 31. The sliding spindle gears of those spindles adjacent the loading sector will be maintained in neutral position by the medium of the raised position of the plunger 35 riding on the cam 36; this position of parts being illustrated in Figs. 3 and 4. The remaining sliding gears will be in their lowermost position with the clutch teeth 32 engaged thus driving the spindle gears whereby all of the other spindles will be rotated. The tool slide and the loading sector will be in raised position as shown in Figs. 3 and 4 thus to permit an operator to insert the work in the chucks or fixtures 24. In initially starting the machine, a work piece may be positioned only in one of the chucks of each pair; for instance the left hand chuck shown in Fig. 3. The operator may then initiate rotation of the carrier by movement of the clutch control lever 54. The carrier will then be rotated about the column, the tools will begin their rotation making one complete revolution during a complete rotation of the carrier and the slide will move from the loading sector with the spindle and will be rapidly moved downward by the cam 61 moving in the cam groove 62. As the slide moves downward, the plunger 35 will strike the elevated portion of the cam plate thus engaging the friction plates of the internal clutch 30 of the gear 26 thereby establishing a friction driving connection from the gear 38 and thereafter the plunger will move off the cam to engage the clutch teeth 32 thus to positively drive the spindle at cutting speeds. During such movement, the next adjacent pair of spindles and tool heads are entering the loading sector from the left, the slide is thus raised through its engagement with the cam path 62 and the spindles are unclutched by engagement of the plunger 35 with the cam 36. As this pair of heads and spindles move past the operator in the loading station, a new piece of work is inserted in one of the chucks, as for instance again, the left hand chuck. These cycles of operation continue until the spindle first loaded again arrives at the loading station. The work which was mounted in the spindle has therefore been subjected to the action of a cutter making one revolution and as in the method above referred to, the turning operation by that tool has been completed. The operator therefore removes the work thus operated upon by the tool 71 and places it in the adjacent chuck and thereafter places a new piece of work in the companion chuck. This cycle of operation continues until all the chucks are loaded. Thereafter, as each pair of spindles passes the loading section, the operator removes that piece of work which has been operated upon by both tools, places the work operated on by merely one tool into the adjacent chuck vacated by the finished work and inserts a new piece in the chuck vacated by the half finished work. By this arrangement, it will be seen that as each station passes the operator, one piece of work operated upon by two separate tools is removed from the machine and a new piece of work is inserted. Thus, in a single revolution of a twelve-spindle apparatus, six pieces of work are completed and six new pieces are inserted. Obviously, the invention is not confined to any specific number of spindles nor is the invention limited to the use of pairs of spindles having different tools in each pair. If desired, all the tools may be similar, in which case during the revolution of the carrier of a twelve-spindle machine, twelve completed pieces of work operated upon only by one tool will be removed and a like number inserted. From a consideration of the structure and arrangement of parts it will be noted that the spindle speeds may be varied with respect to the tool rotating speeds by varying the gears within the bracket 11 so as to provide for a different ratio of carrier rotation with respect to spindle rotation.

In view of the foregoing references to the method employed and to the co-pending applications on the tools thereof, as well as the reference to the co-pending single spindle application, it is not deemed necessary to go into details here with regard to the tools or their method of operation, it being understood that the application is not confined to the use of such tools or to the method of the prior patent. Suffice it, therefore, to say that it is contemplated that the apparatus may utilize cutters and the stepped blades either radially stepped outward or as in the cutter 72 annularly arranged and stepped radially inward and that by a single revolution of the cutter the stepped blades are successively brought into engagement with the surface of the work which is continuously rotated at cutting speeds, it being understood that a portion of the cutters are bladeless and that the cutter axis is arranged in slightly spaced relation to the axis of the work so that during the vertical movement of the slide, the bladeless portion of the cutter is nearest the periphery of the work thus to permit the inserting and withdrawing movement of the cutter without engaging any of its blades with the surface of the work.

From the foregoing, it will be seen that the present invention provides a complete, wholly automatic, mass-production equipment, the only limitation from the time element for the production of work being that time required for the passing of the work through the loading sector which is dependent on the ability of the operator to load and unload the spindles.

It will be understood that the invention herein shown may be subjected to numerous changes, variations, modifications, and the full use of equivalents may be resorted to without departing from the spirit or scope of the invention as particularly outlined in the appended claims.

Having thus set forth the nature of my invention, what I claim is:

1. In a machine tool, the combination of a rotatable carrier, a plurality of sets of work spindles and tool spindles carried thereby, a cam for moving said tool spindles axially with respect to the work spindles, means for rotating said tool spindles at feeding speeds so as to progressively apply a cutting action across the work surface, and means for rotating the work spindles at cutting speed.

2. In a machine tool, the combination with a revolvable carrier having work holders and tool spindles, of stationary means for moving said tool spindles longitudinally of the work spindles and for giving said tool spindles one revolution or rotation during each cycle of longitudinal movement.

3. A metal working apparatus including a rotatable carrier having a circular series of rotatable work spindles, a similar series of rotatable tool spindles, means for moving the spindles of one series axially in a direction parallel to the direction of the axis of the other series of spindles, means for rotating the tool spindles at feeding speeds so as to progressively apply a cutting action across the work surface, and means for transversely adjusting the tool spindles with respect to the axis of the work spindles.

4. A metal working apparatus including a rotatable carrier having a circular series of rotatable work spindles, a similar series of rotatable tool spindles, means for moving the spindles of one series axially in a direction parallel to the direction of the axis of the other series of spindles, means for rotating the work spindles at cutting speeds, means for rotating the tool spindles at feeding speeds so as to progressively apply a cutting action across the work surface, and means for transversely adjusting the tool spindles with respect to the axis of the work spindles without moving them from the arc of the circle formed by the series.

5. In a metal working machine, a rotatable carrier, a series of rotatable spindles mounted therein and fixed against longitudinal movement, a series of rotatable and longitudinally movable spindles, means for rotating the first spindles at cutting speeds, and means for rotating the second spindles at feed speeds so as to progressively apply a cutting action cross the work surface.

6. In a metal working machine, a rotatable carrier, a series of rotatable spindles mounted therein and fixed against longitudinal movement, a series of rotatable and longitudinally movable spindles, means for rotating the first spindle at cutting speeds, and a stationary gear for rotating the second spindles at feeding speeds so as to progressively apply a cutting action across the work surface.

7. In a metal working machine, a rotatable carrier, a series of rotatable spindles mounted therein and fixed against longitudinal movement, a series of rotatable and longitudinally movable spindles, means for rotating the first spindles at cutting speeds, and a stationary gear for rotating the second spindles at feeding speeds so as to progressively apply a cutting action across the work surface and a stationary cam for reciprocating said second mentioned spindles.

8. In a metal working apparatus, the combination of a rotatable series of work spindles, a similar series of step-bladed cutters, tool spindles therefor, means for rotating the work spindle at cutting speeds and the tool spindle at feeding speeds, and means for reciprocating said cutter into and out from a cutting position with respect to work carried by said work holding spindle.

9. A metal turning apparatus including a rotatable series of work spindles, means for holding work on said spindles, means for rotating said spindles at cutting speeds, a similar series of tool spindles, multi-bladed cutters carried by the tool spindles, and means for rotating each tool spindle with its tool to successively bring the blades of said tool into cutting relation with the surface of the work carried by the spindles.

10. A metal turning apparatus including a rotatable series of work spindles, means for holding work on said spindles, means for rotating said spindles at cutting speeds, a similar series of tool spindles, multi-bladed cutters carried by the tool spindles, means for rotating each tool spindle with its tool to successively bring the blades of said tool into cutting relation with the surface of the work carried by the work spindles and means for axially moving each tool and spindle so as to position said tool adjacent the work whereby rotation thereof will bring its blades into cutting position.

11. A metal working apparatus including a rotatable series of spindles adapted to hold work, means for rotating the spindles at cutting speeds, multi-bladed cutters, spindles therefor parallel to but spaced from the axis of rotation of the work spindles, means for moving the tool axially towards and from the work and means for slowly rotating the tools to cause successive action of its blades upon the surface of work held by the work spindles.

12. A metal working apparatus including a series of spindles adapted to hold work, means for rotating the spindles at cutting speeds, multi-bladed cutters, spindles therefor parallel to but spaced from the axis of rotation of the work spindles, means for moving the cutters axially towards and from the work, means for slowly rotating the cutters to cause successive action of its blades upon the surface of work held by the work spindles and means for transversely adjusting the cutters with respect to the axis of the work spindles.

13. In a multiple spindle metal working apparatus, the combination of a continuously moving carrier, a plurality of pairs of rotatable work holders mounted in said carrier, a single drive gear for each pair of work holders, a source of power for said gears and a means for automatically engaging and disengaging said source of power with said gear during the continuous rotation of the carrier.

14. In a multiple spindle metal working apparatus, the combination of a continuously moving carrier, a plurality of pairs of rotatable work holders mounted in said carrier, a single drive gear for each pair of work holders, a source of power for said gears and a means for automatically engaging and disengaging said source of power with said gear during the continuous rotation of the carrier, said means being operable to initially engage said source of power with said gear through friction means.

15. In a multiple spindle metal working apparatus, the combination of a continuously moving carrier, a plurality of pairs of rotatable work holders mounted in said carrier, a single drive gear for each pair of work holders, a source of power for said gears and a means for automatically engaging and disengaging said source of power with said gear during the continuous rotation of the carrier, said means being operable to initially engage said source of power with said gear through friction means and thereafter to positively connect said source of power with said gear.

16. In a multiple spindle metal working apparatus, the combination of a continuously rotatable carrier, a plurality of pairs of work spindles mounted on said carrier, a driving gear for each pair of work spindles, a source of power, means for establishing frictional drive between said source of power and said gear, means for establishing positive drive between said source of power and said gear and means for selectively connecting either of said drives.

17. In a multiple spindle metal working apparatus, the combination of a continuously rotatable carrier, a plurality of pairs of work spindles mounted on said carrier, a driving gear for each pair of work spindles, a source of power, means for establishing frictional drive between said source of power and said gear, means for establishing positive drive between said source of power and said gear, and means for selectively connecting either of said drives, said means being automatically operable through rotation of the carrier.

18. In a multiple spindle metal working machine, a fixed central column including a cam path and a toothed sector, a spindle carrier rotatable about said column, tool heads mounted for rotation with said spindle carrier and engageable with said cam path to cause reciprocation thereof in response to rotated movement of said carrier and tool shafts having gears meshing with said toothed sector whereby said shafts are rotatable by rotation of said carrier.

19. In a multiple spindle metal working apparatus, a continuously rotatable spindle carrier, tool heads mounted on said carrier for rotation therewith, a fixed cam path and a fixed gear, cam followers and gears carried by said heads and engageable respectively with said fixed path and gear, a tool shaft in said tool head connected with the gear carried thereby whereby said shaft will be reciprocated and rotated as a result of the rotating movement of the carrier.

20. In a multiple spindle metal working apparatus, a continuously rotatable spindle carrier, tool heads mounted on said carrier for rotation therewith, a fixed cam path and a fixed gear, cam followers and gears carried by said heads and engageable respectively with said fixed path and gear, a tool shaft in said tool head connected with the gear carried thereby whereby said shaft will be reciprocated and rotated as a result of the rotating movement of the carrier, work holding spindles in said carrier and means for rotating said work holding spindles at cutting speeds.

21. In a multiple spindle machine tool, the combination of a continuously movable spindle carrier, arcuate faced tool slide ways on said carrier, tool slides mounted on said ways and means for transversely adjusting said tool slides on said ways in an arcuate path conforming to the arcuate surface of said ways.

22. In a multiple spindle metal working apparatus, the combination of a fixed base having a central fixed column, a cam path and gear fixed to said column, driving means mounted on said column, a main drive shaft driven thereby and extending through said column, a multiple spindle carrier encircling said column and continuously rotatable thereabout.

23. In a multiple spindle metal working apparatus, a rotatable carrier, a series of rotatable work holding spindles mounted for movement therewith, a series of tool holding spindles mounted for rotatable movement therewith, tools carried by said spindles, means for moving the tools into and out of cutting position with respect to the work carried by the spindles and means for rotating the tool spindles at feeding speed to apply a cutter blade to the work surface.

24. In a multiple spindle metal working apparatus, a rotatable carrier, a series of rotatable work holding spindles mounted for movement therewith, a series of tool holding spindles mounted for rotatable movement therewith, tools carried by said spindles, means for moving the tools into and out of cutting position with respect to the work carried by the spindles and means for rotating the tool spindles at feeding speed to apply a cutter blade to the work surface; said first mentioned means including a cam mounted stationarily with respect to the rotation of the carrier.

25. In a multiple spindle metal working apparatus, a rotatable carrier, a series of rotatable work holding spindles mounted for movement therewith, a series of tool holding spindles mounted for rotatable movement therewith, tools carried by said spindles, means for moving the tools into and out of cutting position with respect to the work carried by the spindles and means for rotating the tool spindles at feeding speed to apply a cutter blade to the work surface; said second mentioned means including a member cooperating with the spindles and fixed with respect to the rotation of the carrier.

EDWARD P. BULLARD.